US012698087B2

(12) United States Patent
Berjot et al.

(10) Patent No.: US 12,698,087 B2
(45) Date of Patent: Aug. 4, 2026

(54) PROPULSION ASSEMBLY COMPRISING AN ENGINE ATTACHMENT THAT IS COMPACT IN TERMS OF HEIGHT, AIRCRAFT COMPRISING AT LEAST ONE SUCH PROPULSION ASSEMBLY

(71) Applicant: Airbus Operations SAS, Toulouse (FR)

(72) Inventors: Michael Berjot, Toulouse (FR); Jacky Puech, Toulouse (FR); David Alric, Toulouse (FR); Solène Cruaud-Prieur, Toulouse (FR); Fabien Poussou, Toulouse (FR); Jérôme Neny, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 19/328,564

(22) Filed: Sep. 15, 2025

(65) Prior Publication Data

US 2026/0077872 A1      Mar. 19, 2026

(30) Foreign Application Priority Data

Sep. 17, 2024    (FR) .................................. FR2409874

(51) Int. Cl.
B64D 27/40          (2024.01)
(52) U.S. Cl.
CPC ......... B64D 27/402 (2024.01); B64D 27/404 (2024.01)
(58) Field of Classification Search
CPC ............................ B64D 27/402; B64D 27/404
See application file for complete search history.

(56) References Cited

U.S. PATENT DOCUMENTS 8,074,923 B2 * 12/2011 Foster .................. B64D 27/404
                                                        244/54
9,248,921 B2 * 2/2016 West .................... B64D 27/404
          (Continued)

FOREIGN PATENT DOCUMENTS

EP          1928739 B1     12/2009
EP          4144647 A1      3/2023
          (Continued)

OTHER PUBLICATIONS

French Search Report for corresponding French Patent Application No. 2409874 dated Mar. 4, 2025.

*Primary Examiner* — Richard Green
*Assistant Examiner* — Michael B. Kreiner
(74) *Attorney, Agent, or Firm* — Greer, Burns & Crain, Ltd.

(57)          ABSTRACT

A propulsion assembly having an engine and an engine attachment which connects the engine and a primary structure of a pylon and which comprises a removable connection connecting a transverse beam and the primary structure. This removable connection has a first contact surface integral with the transverse beam, a second contact surface integral with the primary structure, at least one connection element keeping the first and second contact surfaces pressed against one another, at least one system for transmission of transverse forces between the engine and the primary structure and at least one waiting fail-safe connection distinct from each connection element and configured to generate an additional path for forces only in the event of malfunction of an element of the first removable connection.

9 Claims, 4 Drawing Sheets

(56)  References Cited

U.S. PATENT DOCUMENTS

| | | | | |
|---|---|---|---|---|
| 9,862,497 B2 * | 1/2018 | Ewens | ................. | B64D 27/406 |
| 9,889,943 B2 * | 2/2018 | Ewens | ................. | B64D 27/406 |
| 10,934,009 B2 * | 3/2021 | Combes | .............. | B64D 27/404 |
| 11,542,025 B2 | 1/2023 | Berjot et al. | | |
| 11,760,498 B2 * | 9/2023 | Gormley | .............. | B64D 27/406 |
| | | | | 244/54 |
| 2008/0223983 A1 * | 9/2008 | Lafont | ................. | B64D 27/404 |
| | | | | 244/54 |
| 2023/0072158 A1 | 3/2023 | Berjot et al. | | |

FOREIGN PATENT DOCUMENTS

| | | | |
|---|---|---|---|
| FR | 3098793 A1 | 1/2021 | |
| FR | 3113484 A1 | 2/2022 | |

* cited by examiner

PROPULSION ASSEMBLY COMPRISING AN ENGINE ATTACHMENT THAT IS COMPACT IN TERMS OF HEIGHT, AIRCRAFT COMPRISING AT LEAST ONE SUCH PROPULSION ASSEMBLY

CROSS-REFERENCES TO RELATED APPLICATIONS

This application claims the benefit of French Patent Application Number FR2409874 filed on Sep. 17, 2024, the entire disclosure of which is incorporated herein by way of reference.

FIELD OF THE INVENTION

The present application relates to a propulsion assembly comprising an engine attachment that is compact in terms of height, and to an aircraft comprising at least one such propulsion assembly.

BACKGROUND OF THE INVENTION

According to an embodiment that can be seen in FIGS. 1 and 2, an aircraft 10 comprises several propulsion assemblies 12 positioned under each of the wings 14 of the aircraft. Each propulsion assembly 12 comprises an engine 16, a nacelle (not shown in FIG. 2) positioned around the engine 16, and a pylon 18 connecting the engine 16 and the wing 14.

As shown in FIG. 2, the engine 16 has an axis of rotation A16 and comprises a jet engine hub 20, a fan and a fan casing 22, which has an approximately (at +/−10%) cylindrical shape and in which the fan is positioned.

For the present application, a longitudinal direction X is parallel to the axis of rotation A16 of the engine 16, a horizontal transverse direction Y is horizontal and perpendicular to the axis of rotation A16 of the engine 16, a vertical direction Z is vertical and perpendicular to the axis of rotation A16 of the engine 16. A transverse plane is perpendicular to the axis of rotation A16 of the engine 16. A vertical median plane PVM (visible in FIGS. 3 and 4) corresponds to a vertical plane passing through the axis of rotation A16 of the engine 16. The concepts of front and rear refer to the direction of flow of the gases in the engine 16, these flowing from front to rear.

The pylon 18 comprises a primary structure 24 which is connected to the engine 16 by an engine attachment system 26 and to the wing 14 by an aerofoil attachment system 28, and a secondary structure 24' forming an aerodynamic profile positioned above the primary structure 24.

According to an embodiment of the prior art that can be seen in FIG. 2, the engine attachment system 26 comprises, inter alia, a front engine attachment 30 connecting the front end 24.1 of the primary structure 24 and the fan casing 22 and/or the jet engine hub 20.

According to an embodiment of the prior art described in document FR3098794 and shown in FIGS. 3 and 4, the front engine attachment 30 comprises a transverse beam 32 attached to the front end 24.1 of the primary structure 24, at least a first two-point bracket 34 positioned on a first side of the vertical median plane PMV and connected by a first articulation 34.1 to the transverse beam 32 and by a second articulation 34.2 to the engine 16 (to the jet engine hub 20 or to the fan casing 22) and a second three-point bracket 36 positioned on a second side of the vertical median plane PMV and connected by first and second articulations 36.1, 36.2 to the transverse beam 32 and by a third articulation 36.3 to the engine 16 (to the jet engine hub 20 or to the fan casing 22).

The transverse beam 32 is connected to the front end 24.1 of the primary structure 24 by a removable connection 38.

The transverse beam 32 and the front end 24.1 of the primary structure 24 have, respectively, first and second contact surfaces F32, F24 kept pressed against one another by virtue of the removable connection 38. The latter comprises two cylindrical spigots 40, 40', positioned on either side of the vertical median plane PMV and integral with the primary structure 24, and cylindrical housings 42, 42', one for each cylindrical spigot 40, 40', configured to house the cylindrical spigots 40, 40' with a snug fit, and provided on the transverse beam 32. These cylindrical spigots 40, 40' have axes substantially parallel to the longitudinal direction X. Complementarily, the removable connection 38 comprises connection elements 44.1, 44.2, 44.1', 44.2', such as bolts or screws for example, positioned on either side of the vertical median plane PMV and each having an axis parallel to the longitudinal direction. For each cylindrical spigot 40, 40', the removable connection 38 comprises a first connection element 44.1, 44.1' offset downwards relative to the cylindrical spigot 40, 40' and a second connection element 44.2, 44.2' offset upwards relative to the cylindrical spigot 40, 40'. The connection elements are configured to keep the first and second contact surfaces F24, F32 pressed against one another but also to ensure the transmission of forces between the engine 16 and the primary structure 24, in particular in the event of breakage of one of the cylindrical spigots 40, 40'.

This embodiment results in a relatively large bulk in terms of height, which tends to keep a certain distance between the secondary structure 24' of the pylon and the engine 16 and, ultimately, affects the aerodynamic performance of the aircraft.

SUMMARY OF THE INVENTION

The present invention aims to overcome all or some of the drawbacks of the prior art.

To this end, the invention relates to a propulsion assembly comprising:
- a. an engine,
- b. a pylon which comprises a primary structure having a front end,
- c. at least one engine attachment which connects the engine and the front end of the primary structure and comprises a transverse beam, a first removable connection connecting the transverse beam and the primary structure and a second connection connecting the transverse beam and the engine,
- d. the first removable connection having a first contact surface integral with the transverse beam, a second contact surface integral with the primary structure, at least one connection element keeping the first and second contact surfaces pressed against one another, and at least one system for transmission of transverse forces configured to ensure transmission of forces, oriented essentially in a vertical direction, between the engine and the primary structure.

According to the invention, the first removable connection comprises at least one waiting fail-safe connection distinct from each connection element and configured to generate an additional path for forces only in the event of malfunction of an element of the first removable connection, each waiting fail-safe connection comprising at least one first protruding shape relative to the first contact surface and integral with the transverse beam and at least one second hollow shape relative to the second contact surface, integral with the primary structure and configured to house the first shape, the first and second shapes interacting with one another and having at least one spacing between them in the vertical direction. In addition, the first shape comprises a first trapezoidal contour which has upper and lower edges substantially parallel to one another and perpendicular to the vertical direction, and oblique edges connecting the upper and lower edges By disassociating the connection element(s) and the waiting fail-safe connection(s), it is possible to optimize them independently of one another and to limit their bulk in the vertical direction. Thus, it is possible to have the secondary structure and the engine closer together in order to optimize the aerodynamic performance of the aircraft.

According to another feature, the upper edge has a length greater than the length of the lower edge.

According to another feature, the first shape is a rib that follows the first trapezoidal contour.

According to another feature, the second shape comprises a second approximately trapezoidal contour which comprises upper and lower facets substantially parallel to one another and perpendicular to the vertical direction, and oblique facets connecting the upper and lower facets, the upper and lower facets being spaced apart by a distance greater than the distance separating the upper and lower edges of the first shape.

According to another feature, the first removable connection comprises two systems for transmission of transverse forces positioned symmetrically about a vertical median plane and a waiting fail-safe connection positioned between the two systems for transmission of transverse forces and located in the vertical median plane.

According to another feature, the first removable connection comprises first and second extensions, integral with the primary structure, which extend on either side of the primary structure, each comprising a portion of the second contact surface, a system for transmission of transverse forces being positioned at each of the first and second extensions.

According to another feature, the first removable connection comprises a fitting which has a tubular body fitted in the front end of the primary structure and connected to the primary structure, the tubular body delimiting the recessed second shape and having an end face forming the second contact surface.

According to another feature, the fitting comprises the first and second extensions, the tubular body and the first and second extensions only forming a single same part.

The invention also relates to an aircraft comprising at least one propulsion assembly according to one of the preceding features.

BRIEF DESCRIPTION OF THE DRAWINGS

Further features and advantages will emerge from the description of the invention below, which is provided solely by way of example, with reference to the attached drawings in which.

DETAILED DESCRIPTION OF THE PREFERRED EMBODIMENTS

Figure 1:
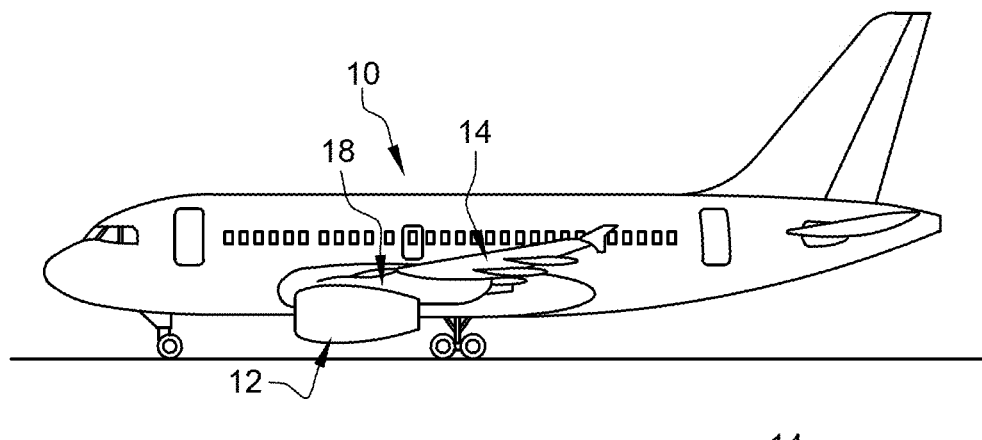
FIG. 1 is a side view of an aircraft.
Figure 2:
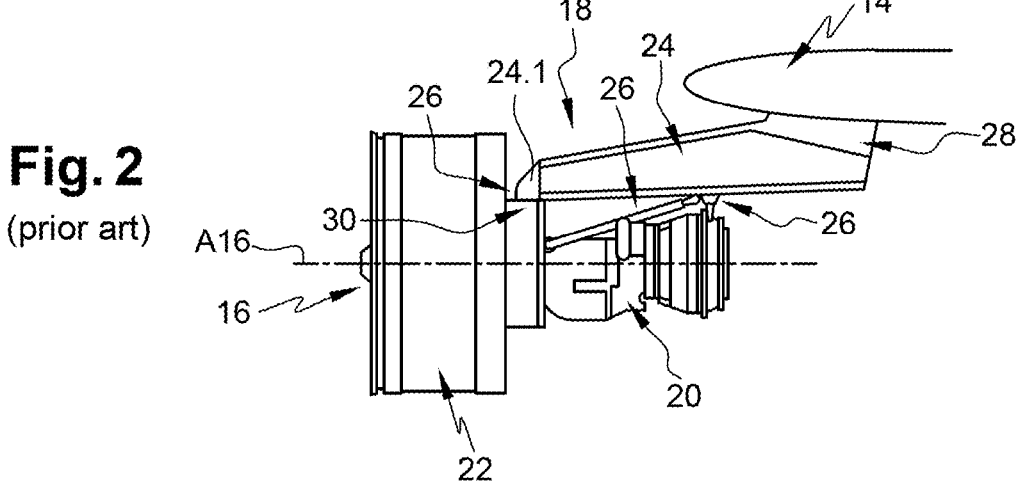
FIG. 2 is a side view of an aircraft propulsion assembly without the nacelle depicting an embodiment of the prior art.
Figure 3:
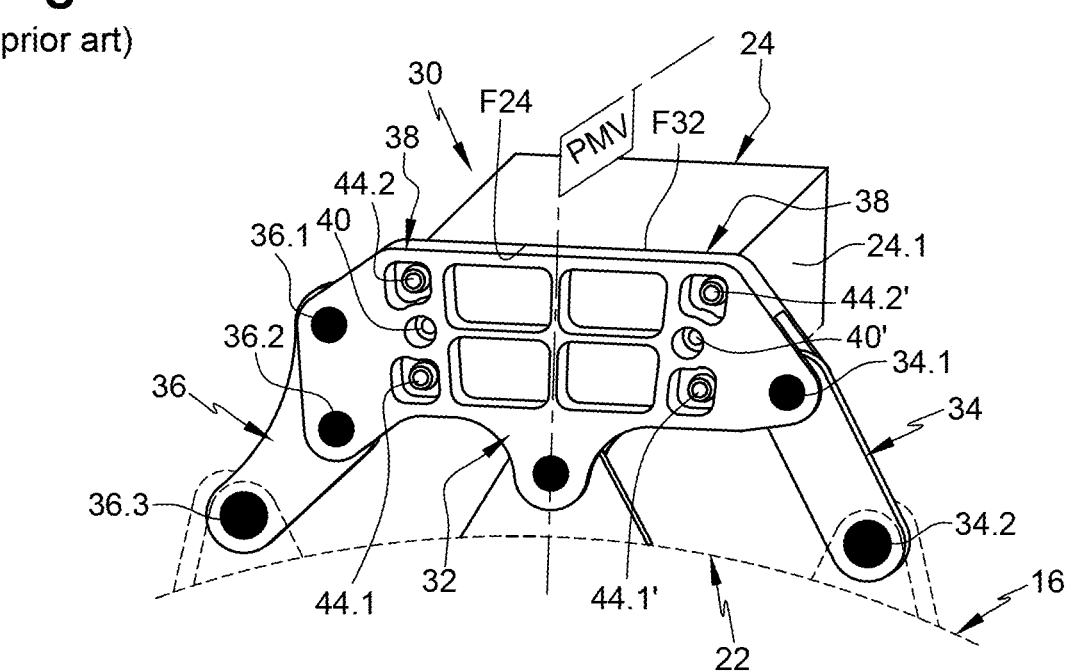
FIG. 3 is a perspective view of a front engine attachment which depicts an embodiment of the prior art.
Figure 4:
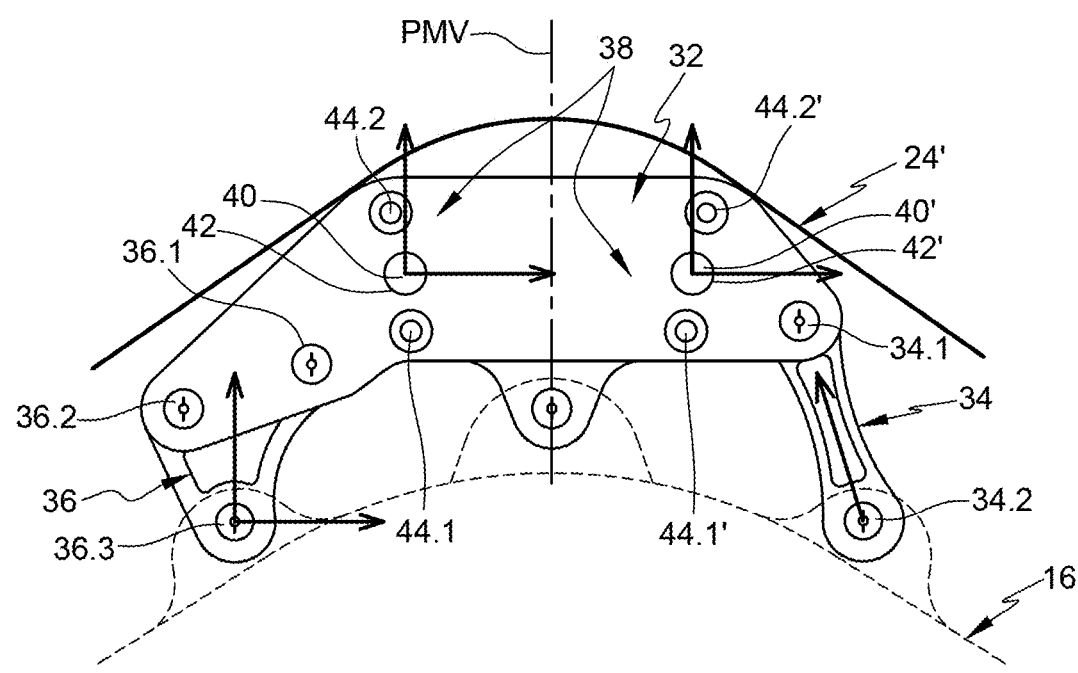
FIG. 4 is an end-on view of a front engine attachment which depicts an embodiment of the prior art.

According to one embodiment, an aircraft comprises at least one propulsion assembly 50 positioned under an aerofoil and connected to the latter. Each propulsion assembly 50 comprises an engine 52 (shown schematically), a nacelle (not shown) positioned around the engine 52, and a pylon 54 connecting the engine 52 and the aerofoil.

The pylon 54 comprises a primary structure 56 connected to the engine 52 by at least one engine attachment system and to the aerofoil by at least one aerofoil attachment system, and a secondary structure 56' forming an aerodynamic profile above the primary structure 56. The primary structure 56 has a front end 56.1 of the primary structure 56, an upper wall 56.2, a lower wall 56.3 and side walls 56.4, 56.5.

The engine attachment system comprises at least one engine attachment 58 connecting in particular the front end 56.1 and the engine 52. Naturally, the engine attachment system may comprise other engine attachments connecting the primary structure 56 and the engine 52.

According to one configuration, this engine attachment 58 is designed to ensure transfer of forces, between the engine 52 and the primary structure 56, oriented in a transverse plane YZ (perpendicular to the longitudinal direction X).

This engine attachment 58 comprises a transverse beam 60, a first removable connection 62 connecting the transverse beam 60 and the primary structure 56 and a second removable connection 64 connecting the transverse beam 60 and the engine 52.

According to one embodiment, the second removable connection 64 comprises at least a first two-point bracket 66, positioned on a first side of the vertical median plane PMV and connected by a first articulation 66.1 to the transverse beam 60 and by a second articulation 66.2 to the engine 52, and a second three-point bracket 68 positioned on a second side of the vertical median plane PMV and connected by first and second articulations 68.1, 68.2 to the transverse beam 60 and by a third articulation 68.3 to the engine 52. According to one configuration, each of the first, second and third articulations 66.1, 66.2, 68.1, 68.2, 68.3 comprises an axis of pivoting substantially (+/−10%) parallel to the longitudinal direction X.

Figure 6:
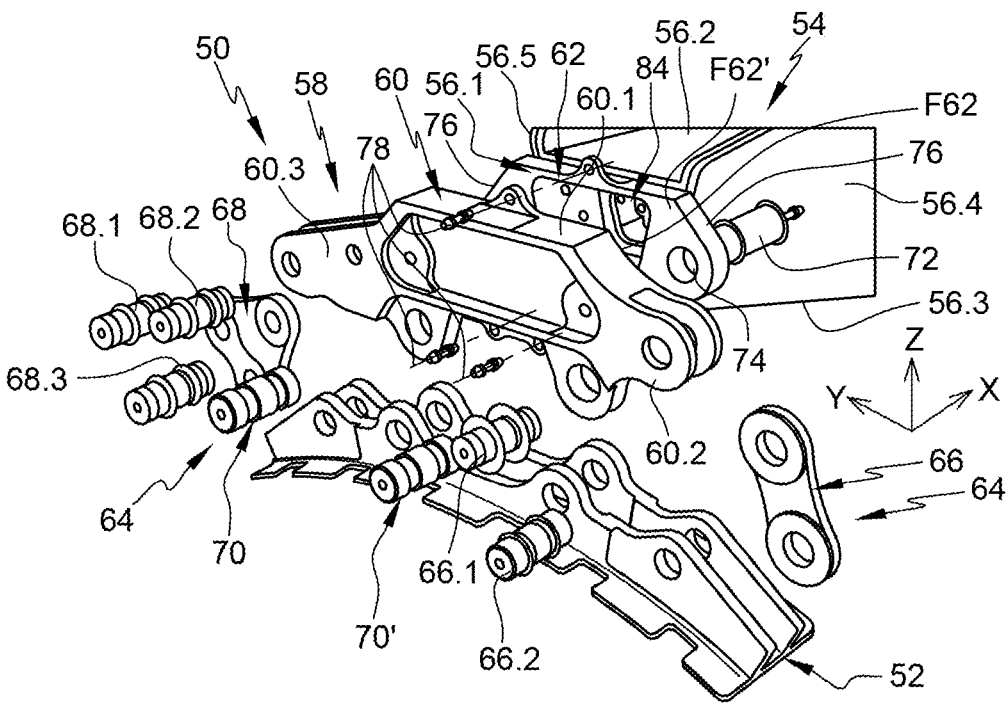
FIG. 6 is a perspective view of a front engine attachment, in the dismantled state, which depicts an embodiment of the invention.
Figure 7:
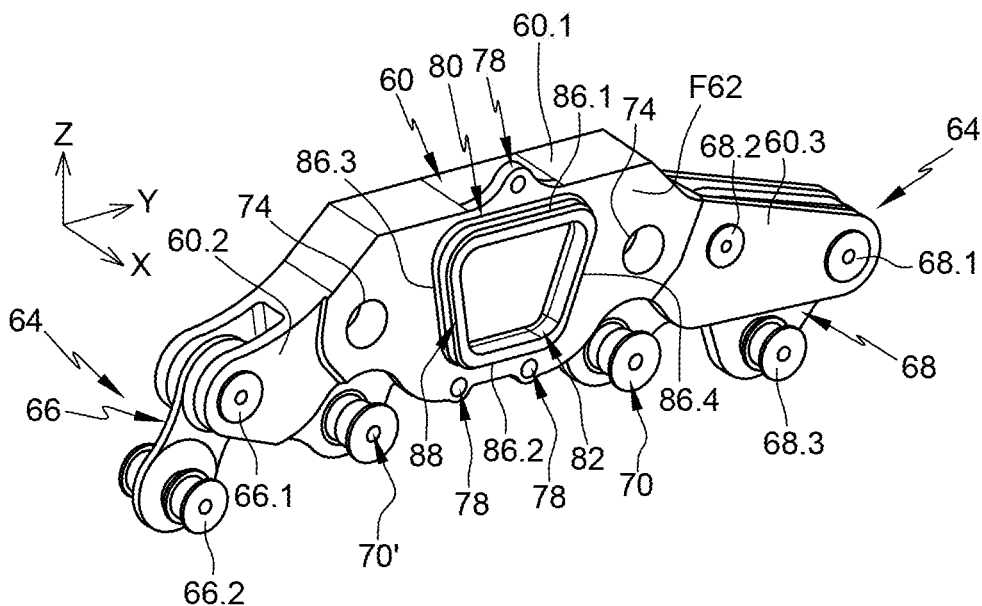
FIG. 7 is a perspective view of a transverse beam of the front engine attachment visible in the FIG. 6.
Figure 9:
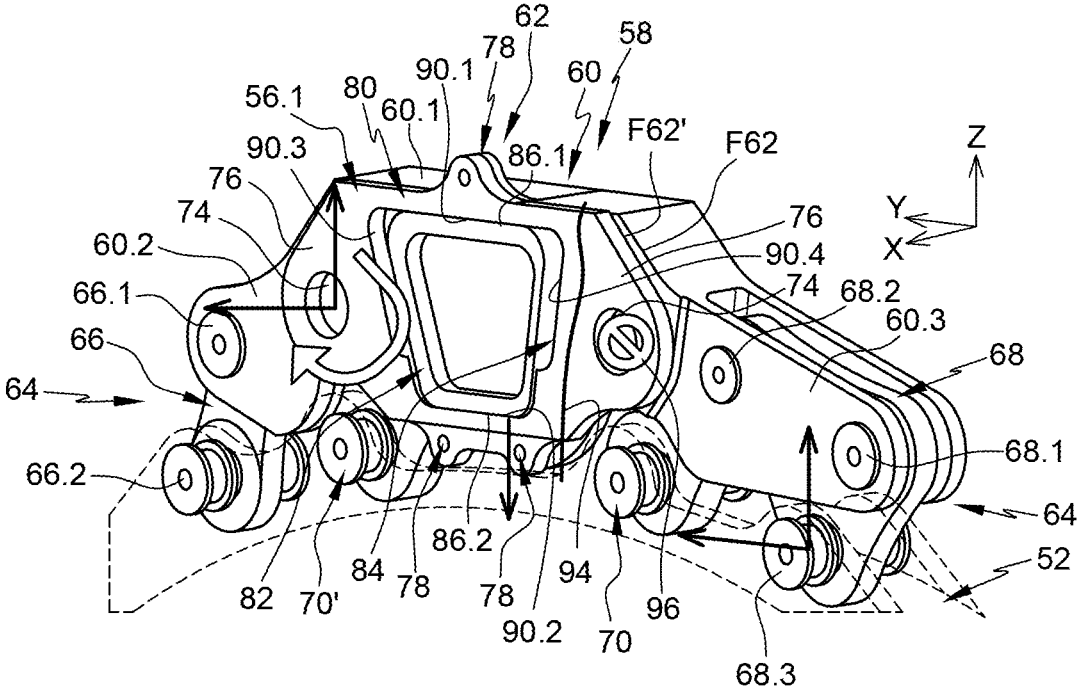

The second removable connection 64 generally comprises at least one waiting fail-safe connection 70, connecting the transverse beam 60 and the engine 52, configured not to generate a path for forces when the transverse beam 60, the first and second brackets 66, 68 and the articulations 66.1, 66.2, 68.1, 68.2, 68.3 are functional and to generate an additional path for forces only in the event of failure of at least one element out of the transverse beam 60, the first and second brackets 66, 68 and the articulations 66.1, 66.2, 68.1, 68.2, 68.3. According to a first design that can be seen in FIG. 5, the second removable connection 64 comprises a single waiting fail-safe connection 70 located in the vertical median plane PMV. According to a second design that can be seen in FIGS. 6, 7 and 9, the second removable connection 64 comprises two waiting fail-safe connections 70, 70' that are symmetrical about the vertical median plane PMV.

The second removable connection 64 will not be described in more detail as it may be identical to those in the prior art.

The transverse beam 60 comprises a central portion 60.1 positioned at least partially in the extension of the primary structure 56 and first and second branches 60.2, 60.3 positioned on either side of the central portion 60.1 and connected respectively to the first and second brackets 66, 68. According to one configuration, each of the first and second branches 60.2, 60.3 comprises a yoke interacting with the first or second bracket 66, 68. These first and second branches will not be described in more detail as they may be identical to those in the prior art.

The first removable connection 62 comprises a first contact surface F62 integral with the transverse beam 60 and a second contact surface F62' integral with the primary structure 56, the first and second contact surfaces F62, F62' being pressed against one another and positioned approximately in transverse planes. The first contact surface F62 corresponds to a rear face of the central portion 60.1 of the transverse beam 60.

The first removable connection 62 comprises at least one spigot 72, integral with a first element out of the primary structure 56 and the transverse beam 60, and at least one housing 74 configured to house the spigot 72, with a tight fit (with no play in a transverse plane), and integral with a second element different to the first element out of the primary structure 56 and the transverse beam 60. Each of the spigots and housings 72, 74 has a lateral face substantially parallel to the longitudinal direction X. According to one configuration, the spigots and the housings 72, 74 are cylindrical and each has an axis of revolution substantially parallel to the longitudinal direction X. According to one arrangement, each spigot 72 is integral with the transverse beam 60 and each housing 74 is integral with the primary structure 56. Each spigot 72 protrudes relative to the first contact surface F62 and each housing 74 is recessed relative to the second contact surface F62'.

According to one arrangement, the first removable connection 62 comprises two pairs, each comprising a spigot 72 and a housing 74, positioned on either side of the vertical median plane PMV, preferably symmetrical about the vertical median plane PMV.

According to one configuration, the central portion 60.1 extends on either side of the side walls 56.4, 56.5 of the primary structure 56. Thus, the first contact surface F62 extends on either side of the side walls 56.4, 56.5 of the primary structure 56. According to this configuration, the first removable connection 62 comprises first and second extensions 76, integral with the primary structure 56, which extend on either side of the primary structure 56, each comprising a portion of the second contact surface F62'. Thus, in operation, each of the first and second extensions 76 has a face (corresponding to a portion of the second contact surface F62') in contact with a face (corresponding to a portion of the first contact surface F62) of the central portion 60.1 of the transverse beam 60. According to this configuration, each of the first and second extensions 76 comprises a housing 74 configured to receive a spigot 72 integral with the transverse beam 60.

Naturally, the invention not limited to this configuration concerning the number and the arrangement of the spigot(s) 72 and the housing(s) 74. Whatever the embodiment, the first removable connection 62 comprises at least one system for transmission of transverse forces 72/74 configured to ensure transmission of forces oriented essentially (+/−10%) vertically (parallel to the vertical direction Z). By way of example, each system for transmission of transverse forces 72/74 comprises a pair made up of a spigot 72 and a housing 74. According to one preferred arrangement, the first removable connection 62 comprises two systems for transmission of transverse forces 72/74 positioned symmetrically about the vertical median plane PMV.

The first removable connection 62 comprises at least one connection element 78 keeping the first and second contact surfaces F62, F62' pressed against one another. According to one embodiment, each connection element 78 is a screw, a bolt or a rivet and comprises a shaft having an axis substantially parallel to the longitudinal direction X.

According to one configuration, the first removable connection 62 comprises several connection elements 78 positioned symmetrically about the vertical median plane PMV and distributed around the periphery of the central portion 60.1 of the transverse beam 60.

According to a particular aspect of the invention, the connection element(s) 78 is (are) configured to ensure take-up of forces in the longitudinal direction X in order to keep the first and second contact surfaces F62, F62' pressed against one another and not shearing forces in a transverse plane. Consequently, each connection element 78 has a cross section (in a transverse plane) which is small, corresponding to a small bulk in the vertical direction or in terms of height.

The first removable connection 62 comprises at least one waiting fail-safe connection 80 configured not to generate paths for forces when none of the systems for transmission of transverse forces 72/74 is damaged and to generate an additional path for forces taking up forces in a transverse plane, in particular vertical forces (oriented in the vertical direction Z) only in the event of malfunction of an element of the first removable connection 62, in particular when at least one system for transmission of transverse forces 72/74 is defective and/or damaged, this waiting fail-safe connection 80 being distinct from each connection element 78.

This waiting fail-safe connection 80 is not configured to ensure that the first and second contact surfaces F62, F62' are pressed against one another.

According to one arrangement, each waiting fail-safe connection 80 is positioned approximately at the same height as the system(s) for transmission of transverse forces 72/74. In the presence of two system(s) for transmission of transverse forces 72/74, the first removable connection 62 comprises a waiting fail-safe connection 80 positioned between the two system(s) for transmission of transverse forces 72/74 and located in the vertical median plane PMV.

The fact that the waiting fail-safe connection 80 is positioned between the two system(s) for transmission of transverse forces 72/74 and substantially at the same height as them makes it possible to obtain a small bulk in the vertical direction Z (in terms of height).

According to one embodiment, each waiting fail-safe connection 80 comprises at least one first shape 82 integral with the transverse beam 60 and in relief relative to the first contact surface F62 and at least one second shape 84 integral with the primary structure 56 and in relief relative to the second contact surface F62', the first and second shapes 82, 84 interacting with one another and having at least one spacing E between them in the vertical direction Z. According to a first variant, the first shape 82 protrudes relative to the first contact surface F62 and the second shape 84 is recessed relative to the second contact surface F62' and is configured to house the first shape 82. According to a second variant, the first shape 82 is recessed relative to the first contact surface F62 and the second shape 84 protrudes relative to the second contact surface F62' and is configured to be housed in the first shape 82.

The spacing E is greater than 1 mm and of the order of a few millimeters.

According to one configuration, the first shape 82 is a protrusion and comprises a first trapezoidal contour which has upper and lower edges 86.1, 86.2, opposite and substantially parallel to one another and perpendicular to the vertical direction Z, and oblique edges 86.3, 86.4, connecting the upper and lower edges 86.1, 86.2, substantially symmetrical about the vertical median plane PMV. According to one arrangement, the upper edge 86.1 has a length (distance measured in the horizontal transverse direction Y) that is greater than the length of the lower edge 86.2. According to one embodiment, the first shape 82 is a rib 88, integral with the transverse beam 60 and protrudes relative to the first contact surface F62, which follows the first trapezoidal contour.

Figure 8:
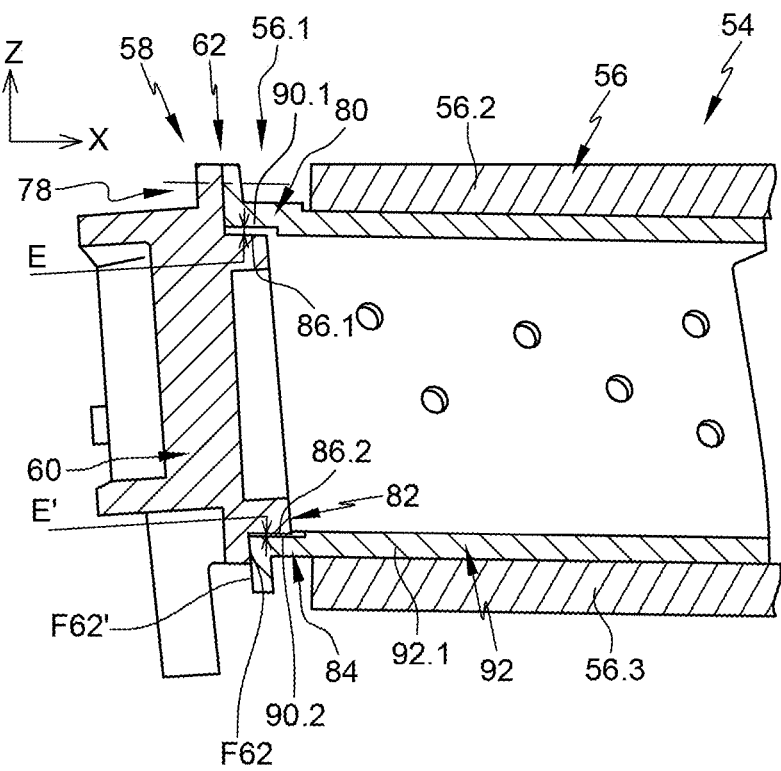
FIG. 8 is a longitudinal section through a portion of a front engine attachment which depicts an embodiment of the invention, FIG. 9 schematically depicts the front engine attachment visible in FIG. 6, showing the paths of forces.

Complementarily, the second shape 84 comprises a second approximately trapezoidal contour which comprises upper and lower facets 90.1, 90.2 substantially parallel to one another and perpendicular to the vertical direction Z, and oblique facets 90.3, 90.4 connecting the upper and lower facets 90.1, 90.2 and substantially symmetrical about the vertical median plane PMV, the upper and lower facets 90.1, 90.2 being spaced apart by a distance greater than the distance separating the upper and lower edges 86.1, 86.2 of the first shape 82. As shown in FIG. 8, the upper and lower facets 90.1, 90.2 are respectively substantially parallel to the upper and lower edges 86.1, 86.2 and spaced apart from these edges. Thus, the first removable connection 62 comprises a first spacing E between the upper edge and facet 86.1, 90.1 and a second spacing E' between the lower edge and facet 86.2, 90.2.

According to one embodiment, the first removable connection 62 comprises a fitting 92 which has a tubular body 92.1 fitted in the front end 56.1 of the primary structure 56, positioned between the upper, lower and side walls 56.2, 56.3, 56.4, 56.5 and connected to the primary structure 56, more specifically to at least one of the upper, lower and side walls 56.2, 56.3, 56.4, 56.5, this tubular body 92.1 delimiting the recessed second shape 84 and having an end face forming the second contact surface F62'. According to one configuration, the fitting 92 comprises first and second extensions 76 connected to the tubular body 92.1, on each of which is positioned a system for transmission of transverse forces 72/74, the tubular body 92.1 and the first and second extensions 76 only forming a single same part.

As shown in FIG. 8, when neither the transverse beam 60 nor the systems for transmission of transverse forces 72/74 are damaged, the first and second shapes 82, 84 are spaced apart in the vertical direction Z such that the waiting fail-safe connection 80 does not form paths for forces between the engine 52 and the primary structure 56.

When the transverse beam 60 has a damaged area 94 between the waiting fail-safe connection 80 and one of the systems for transmission of transverse forces 72/74 and/or one of the systems for transmission of transverse forces 72/74 has a damaged area 96, the first and second shapes 82, 84 are in contact one with another and the waiting fail-safe connection 80 forms a path for forces between the engine 52 and the primary structure 56.

Unlike the prior art, the connection element(s) 78 only keep(s) the first and second contact surfaces F62, F62' against one another and do(es) not perform the function of waiting fail-safe connection. Consequently, it has a small section in a transverse plane.

Figure 5:
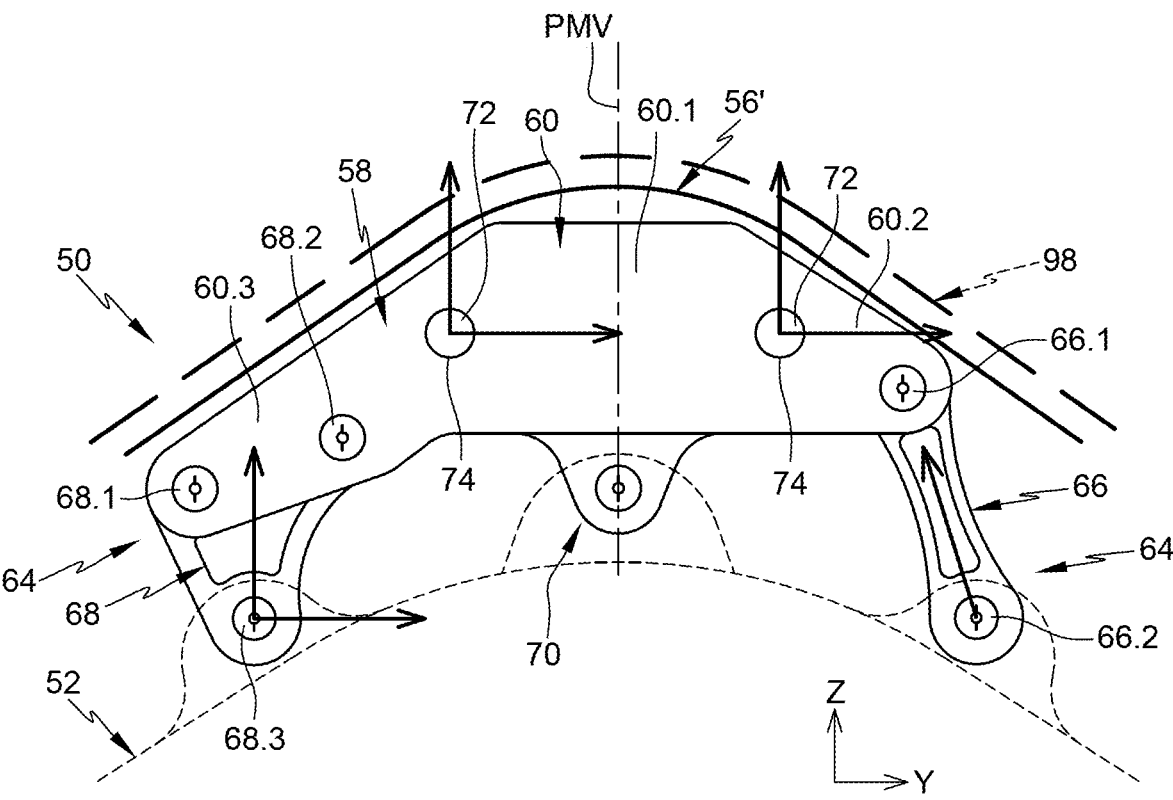
FIG. 5 is an end-on view of a front engine attachment which depicts an embodiment of the invention.

Disassociating the connection element(s) 78 and the waiting fail-safe connection(s) 80 makes it possible to optimize each of them and to limit their bulk in terms of height in the vertical direction Z. Thus, as shown in FIG. 5, it is possible to have the secondary structure 56' and the engine 52 closer together (unlike a secondary structure 98 of a pylon in the prior art) order to optimize the aerodynamic performance of the aircraft.

Providing a system for transmission of transverse forces 72/74 on each of the extensions 76 makes it possible to space the systems for transmission of transverse forces 72/74 apart as far as possible, facilitating the positioning of a waiting fail-safe connection 80 between said systems for transmission of transverse forces 72/74.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly comprising:
   an engine;
   a pylon which comprises a primary structure having a front end; and
   at least one engine attachment which connects the engine and the front end of the primary structure and comprises
   a transverse beam, a first removable connection connecting the transverse beam and the primary structure, and a second connection connecting the transverse beam and the engine,
   wherein the first removable connection has
      a first contact surface integral with the transverse beam,
      a second contact surface integral with the primary structure,
      at least one connection element keeping the first contact surface and the second contact surface pressed against one another, and
      at least one system for transmission of transverse forces configured to transmit forces, oriented essentially in a vertical direction, between the engine and the primary structure, and
   wherein the first removable connection further comprises
      at least one waiting fail-safe connection distinct from the at least one connection element and configured to generate an additional path for forces only in an event of malfunction of an element of the first removable connection, wherein the at least one waiting fail-safe connection comprises at least one first shape integral with the transverse beam and projecting relative to the first contact surface and at least one second shape integral with the primary structure, hollow relative to the second contact surface and configured to house the at least one first shape, wherein the at least one first shape and the at least one second shape interact with one another and having at least one spacing therebetween in the vertical direction, and wherein the at least one first shape comprises a first trapezoidal contour which has an upper edge and a lower edge substantially parallel to one another and perpendicular to the vertical direction, and oblique edges connecting the upper edge and the lower edge.

2. The propulsion assembly according to claim 1, wherein the upper edge has a length greater than the length of the lower edge.

3. The propulsion assembly according to claim 1, wherein the at least one first shape is a rib that follows the first trapezoidal contour.

4. The propulsion assembly according to claim 1, wherein the at least one second shape comprises a second approximately trapezoidal contour which comprises an upper facet and a lower facet substantially parallel to one another and perpendicular to the vertical direction, and oblique facets connecting the upper facet and the lower facet, the upper facet and the lower facet spaced apart by a distance greater than a distance separating the upper edge and the lower edge of the at least one first shape.

5. The propulsion assembly according to claim 1, wherein the first removable connection comprises two systems for transmission of transverse forces positioned symmetrically about a vertical median plane and the at least one waiting fail-safe connection positioned between the two systems for transmission of transverse forces and located in the vertical median plane.

6. The propulsion assembly according to claim 1, wherein the first removable connection comprises a first extension and a second extension each integral with the primary structure and which extend on either side of the primary structure, each comprising a portion of the second contact surface, and a system for transmission of transverse forces positioned at the first extension and at the second extension.

7. The propulsion assembly according to claim 1, wherein the first removable connection comprises a fitting which has a tubular body fitted in the front end of the primary structure and connected to the primary structure, the tubular body delimiting the at least one second shape and having an end face forming the second contact surface.

8. The propulsion assembly according to claim 7, wherein the first removable connection comprises a first extension and a second extension each integral with the primary structure and which extend on either side of the primary structure, each comprising a portion of the second contact surface, and a system for transmission of transverse forces positioned at the first extension and at the second extension, and, wherein the fitting comprises the first extension and the second extension such that the tubular body, the first extension, and the second extension form a single part.

9. An aircraft comprising:
at least one propulsion assembly according to claim 1.

* * * * *